(12) United States Patent
Melvin, III

(10) Patent No.: US 7,509,621 B2
(45) Date of Patent: Mar. 24, 2009

(54) METHOD AND APPARATUS FOR PLACING ASSIST FEATURES BY IDENTIFYING LOCATIONS OF CONSTRUCTIVE AND DESTRUCTIVE INTERFERENCE

(75) Inventor: Lawrence S. Melvin, III, Hillsboro, OR (US)

(73) Assignee: Synopsys, Inc., Mountain View, CA (US)

( * ) Notice: Subject to any disclaimer, the term of this patent is extended or adjusted under 35 U.S.C. 154(b) by 874 days.

(21) Appl. No.: 11/028,980

(22) Filed: Jan. 3, 2005

(65) Prior Publication Data

US 2006/0147815 A1 Jul. 6, 2006

(51) Int. Cl.
G06F 17/50 (2006.01)
(52) U.S. Cl. .............................. 716/21; 716/19; 716/20; 430/5; 430/30
(58) Field of Classification Search ............. 716/19–21; 430/5, 30
See application file for complete search history.

(56) References Cited

U.S. PATENT DOCUMENTS 7,231,629 B2 * 6/2007 Laidig ........................ 716/21
7,247,574 B2 * 7/2007 Broeke et al. ................ 438/725
2005/0142470 A1 * 6/2005 Socha et al. .................. 430/30
2006/0075377 A1 * 4/2006 Broeke et al. ................. 716/19

FOREIGN PATENT DOCUMENTS

EP 1 439 419 A2 7/2004
EP 1 439 420 A1 7/2004

* cited by examiner

Primary Examiner—Thuan Do
Assistant Examiner—Nghia M Doan
(74) Attorney, Agent, or Firm—Park, Vaughan & Fleming LLP

(57) ABSTRACT

One embodiment of the present invention provides a system that determines a location in a layout to place an assist feature. During operation, the system receives a layout of an integrated circuit. Next, the system selects an evaluation point in the layout. The system then chooses a candidate location in the layout for placing an assist feature. Next, the system determines the final location in the layout to place an assist feature by, iteratively, (a) selecting perturbation locations for placing representative assist features in the proximity of the candidate location, (b) computing aerial-images using an image intensity model, the layout, and by placing representative assist features at the candidate location and the perturbation locations, (c) calculating image-gradient magnitudes at the evaluation point based on the aerial-images, and (d) updating the candidate location for the assist feature based on the image-gradient magnitudes.

15 Claims, 7 Drawing Sheets

METHOD AND APPARATUS FOR PLACING ASSIST FEATURES BY IDENTIFYING LOCATIONS OF CONSTRUCTIVE AND DESTRUCTIVE INTERFERENCE

BACKGROUND

1. Field of the Invention

The present invention is related to integrated circuit fabrication. More specifically, the present invention is related to a method and apparatus for placing assist features in a mask layout using an aerial-image intensity model.

2. Related Art

The dramatic improvements in semiconductor integration densities in recent years have largely been achieved through corresponding improvements in semiconductor manufacturing technologies.

One such semiconductor manufacturing technology involves placing assist features on a mask layout. Note that assist features can be printing (e.g., super-resolution assist features) or non-printing (e.g., sub-resolution assist features). In either case, these assist features are meant to improve the lithographic performance of the lines intended to be printed on the wafer.

Present techniques for placing assist features use a rule-based methodology in which assist features are placed based on combinations of feature width and spacing parameters.

Unfortunately, optical behavior with off-axis illumination is complex and requires an elaborate set of assist feature synthesis rules. As a result, creating and maintaining a robust set of placement rules that are guaranteed to work properly for arbitrary configurations is very difficult. In addition, maintaining rules in a manufacturing environment is very expensive.

Hence, what is needed is a method and apparatus for placing assist features in a mask layout without the problems described above.

SUMMARY

One embodiment of the present invention provides a system that determines a location in a layout to place an assist feature. During operation, the system receives a layout of an integrated circuit. Next, the system selects an evaluation point in the layout. The system then chooses a candidate location in the layout for placing an assist feature. Next, the system determines the final location in the layout to place an assist feature by, iteratively, (a) selecting perturbation locations for placing representative assist features in the proximity of the candidate location, (b) computing aerial-images using an image intensity model, the layout, and by placing representative assist features at the candidate location and the perturbation locations, (c) calculating image-gradient magnitudes at the evaluation point based on the aerial-images, and (d) updating the candidate location for the assist feature based on the image-gradient magnitudes.

In a variation on this embodiment, the system chooses a candidate location in the layout by identifying the location of a constructive interference node in the aerial-image that is closest to the evaluation point.

In a variation on this embodiment, the system updates the candidate location by computing a location for the assist feature such that the magnitude of an image-gradient at the evaluation point achieves a local extremum.

In a further variation on this embodiment, the system computes the location for the assist feature by (a) constructing an interpolating polynomial using the set of image-gradient magnitudes; and (b) computing the location for the assist feature using the interpolating polynomial.

In a variation on this embodiment, the assist feature can be a sub-resolution assist feature or a super-resolution assist feature.

Another embodiment of the present invention provides a system that places an assist feature in a layout. During operation, the system receives a layout of an integrated circuit. Next, the system selects an evaluation point in the layout. The system then identifies locations of constructive and destructive interference nodes using the magnitude of an image-intensity gradient of an aerial-image at the evaluation point, wherein the aerial-image is calculated using an image intensity model, the layout, and by placing an representative assist feature at a candidate location in the layout. Finally, the system places the assist feature in the layout based on the locations of the constructive and destructive interference nodes.

In a variation on this embodiment, the system identifies locations of constructive and destructive interference nodes by determining a location for an assist feature such that the magnitude of an image-intensity gradient at the evaluation point achieves a local extremum.

In a further variation on this embodiment, the system determines the location for an assist feature by (a) choosing perturbation locations in the layout; (b) calculating the magnitudes of image-intensity gradients at the evaluation point based on aerial-images that are computed using an image intensity model, the layout, and by placing representative assist features at the perturbation locations; (c) constructing an interpolating polynomial using the magnitudes of the image-intensity gradients at the evaluation point; and (d) computing the location for the assist feature using the interpolating polynomial.

DETAILED DESCRIPTION

Integrated Circuit Design and Fabrication

Figure 1:
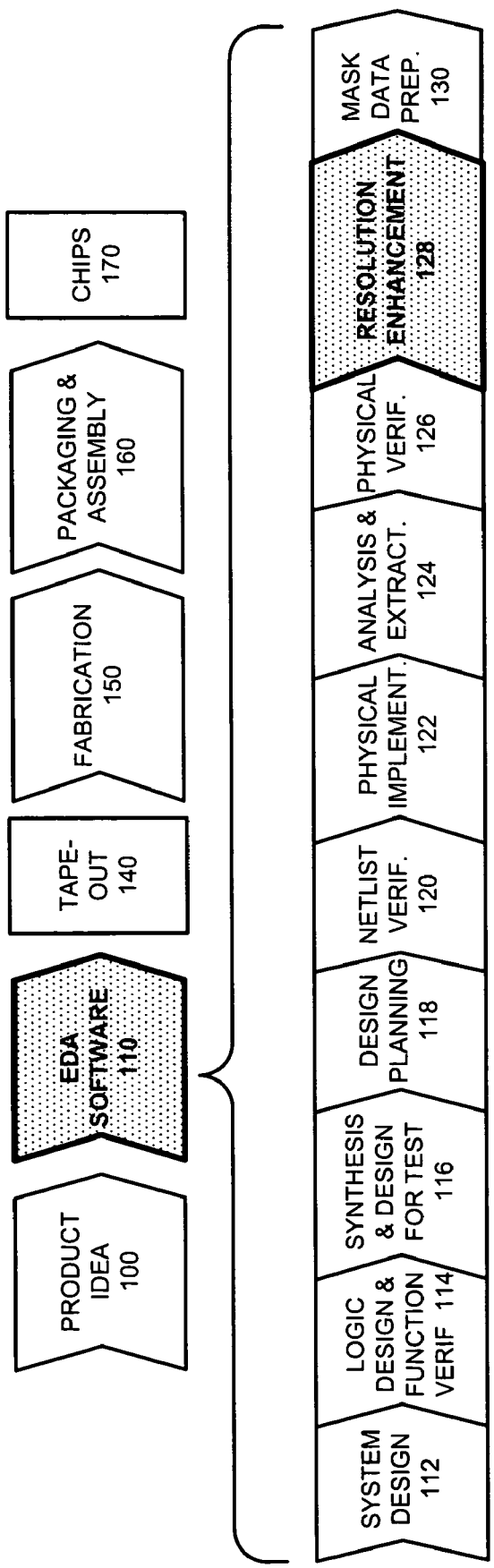
FIG. 1 illustrates various steps in the design and fabrication of an integrated circuit in accordance with an embodiment of the present invention.

FIG. 1 illustrates various steps in the design and fabrication of an integrated circuit in accordance with an embodiment of the present invention. The process starts with a product idea (step 100). Next, the product idea is realized using an integrated circuit, which is designed using Electronic Design Automation (EDA) software (step 110). Once the circuit design is finalized, it is taped-out (step 140). After tape-out, the process goes through fabrication (step 150), packaging, and assembly (step 160). The process eventually culminates with the production of chips (step 170).

The EDA software design step 110, in turn, includes a number of sub-steps, namely, system design (step 112), logic design and function verification (step 114), synthesis and design for test (step 116), design planning (step 118), netlist verification (step 120), physical implementation (step 122), analysis and extraction (step 124), physical verification (step 126), resolution enhancement (step 128), and mask data preparation (step 130).

Assist feature placement can take place during the resolution enhancement step 128. For example, assist feature placement can be implemented in the Proteus® product from Synopsys, Inc.

Assist Features

Assist features are a powerful resolution enhancement technique (RET) for improving process performance and isofocal properties of isolated features during semiconductor manufacturing. In particular, sub-resolution assist features (SRAFs) have been especially effective when applied to gate structures and other one-dimensional features. (For the sake of clarity, the present invention has been described in the context of sub-resolution assist features. But, it will be apparent to one skilled in the art that the present invention can be readily applied to other kinds of assist features, such as super-resolution assist features. In the remainder of the instant application, unless otherwise stated, the term "assist feature" will refer to a sub-resolution assist feature.)

Figure 2:
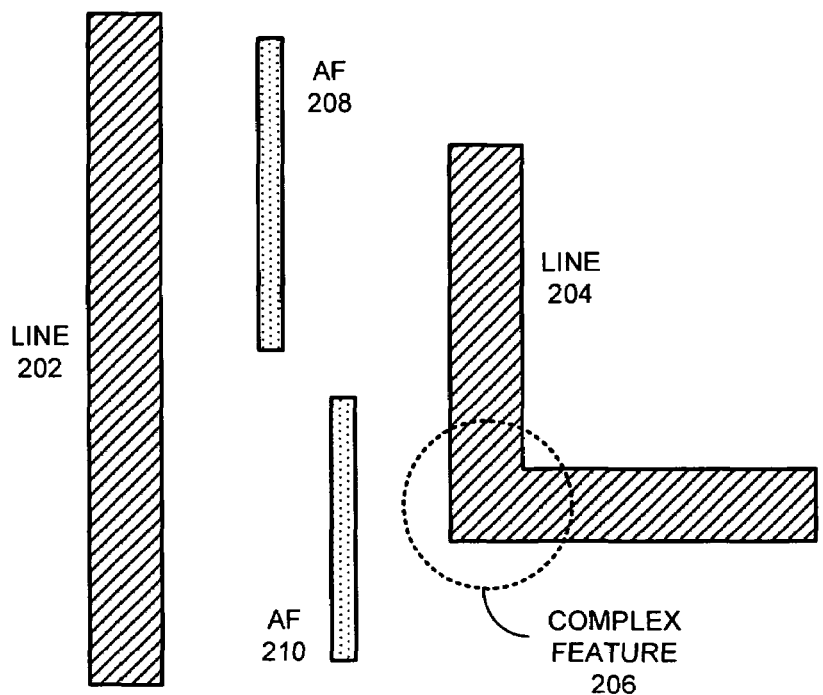
FIG. 2 illustrates assist feature placement for a portion of an integrated circuit layout in accordance with an embodiment of the present invention.

FIG. 2 illustrates assist feature placement for a portion of an integrated circuit layout in accordance with an embodiment of the present invention.

Lines 202 and 204 are part of an integrated circuit layout. Note that line 204 contains complex feature 206. Assist feature placement is more challenging when a layout contains complex features. For example, due to the complex feature 206, we may need to place two assist features 208 and 210 that are staggered, instead of just one assist feature. A layout that has multiple lines with varying pitches is another example of a complex layout.

Present methods for placing assist features use a rule-based methodology where the assist feature placement is dictated by combinations of feature width and spacing parameters.

Figure 3:
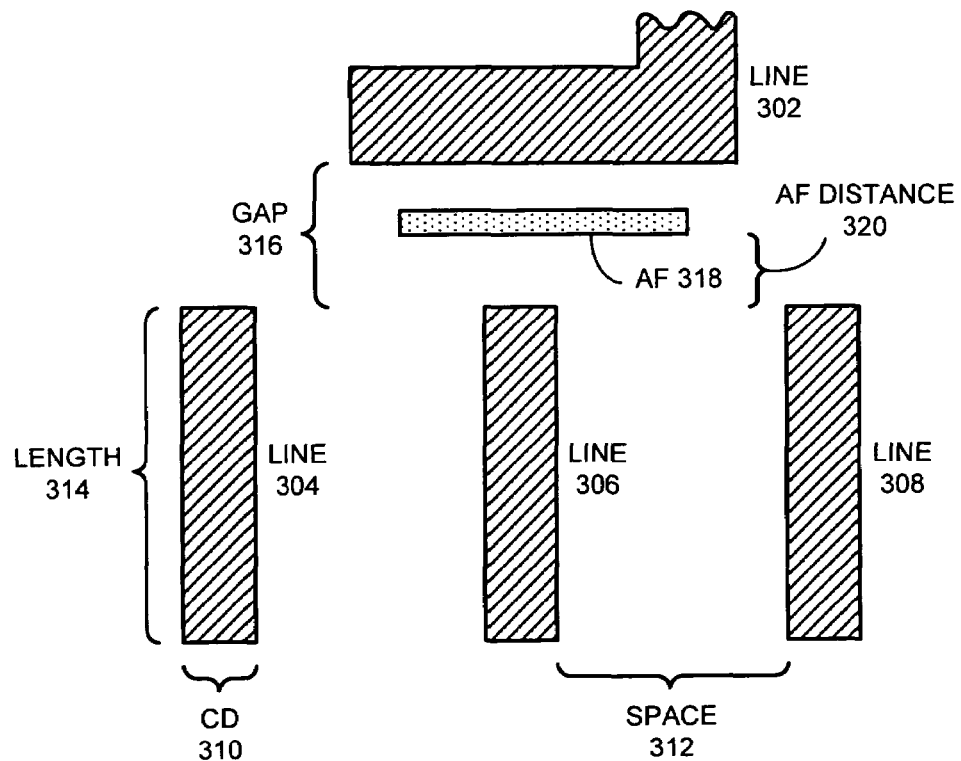
FIG. 3 illustrates assist feature placement using a rule-based methodology in accordance with an embodiment of the present invention.

FIG. 3 illustrates assist feature placement using a rule-based methodology in accordance with an embodiment of the present invention.

Lines 302, 304, 306, and 308 are part of an integrated circuit layout. In a rule-based approach, assist feature (AF) 318 placement can depend on a variety of factors which are organized in the form of a rule table. For example, the AF distance 320 can be a determined based on a rule table that includes a variety of factors, such as, the critical dimension (CD) 310, space 312, length 314, and gap 316.

Unfortunately, for large and complex layouts the rule table can become extremely large and unwieldy. Moreover, the derivation of assist feature placement rules is a difficult process that involves many measurement points on wafers and test reticles.

Fortunately, the data gathered for use in optical proximity correction (OPC) models can also be used for placing AFs. In one embodiment of the present invention, the OPC model is enhanced to determine the optimal location for an assist feature as judged by focus window and isofocal line-width properties.

Interference Nodes

Recent studies have shown that optimal assist feature placement occurs at the constructive interference nodes for a dark field contact reticle. Conversely, optimal AF placement for a clear field reticle occurs at the destructive interference node.

Figure 4A:
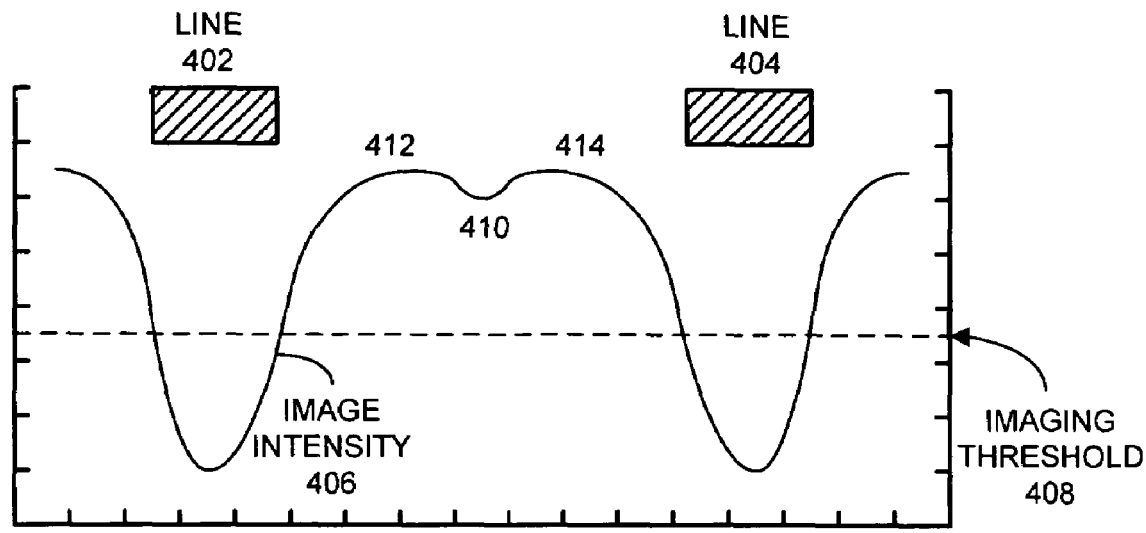
FIG. 4A illustrates interference nodes in an aerial image in accordance with an embodiment of the present invention.

FIG. 4A illustrates interference nodes in an aerial image in accordance with an embodiment of the present invention.

Line 402 and 404 are cross-sections of two lines in an integrated circuit layout. Image intensity curve 406 illustrates the variation of the image intensity of the aerial image. Specifically, curve 406 illustrates constructive interference nodes 412 and 414, and destructive interference node 410. Note that imaging threshold 408 determines the features that will image on the wafer. (Recall that in a dark field reticle, a feature images on the wafer if the corresponding image intensity is below the imaging threshold. On the other hand, in a clear field reticle, a feature images on the wafer if the corresponding image intensity is above the imaging threshold.)

Figure 4B:
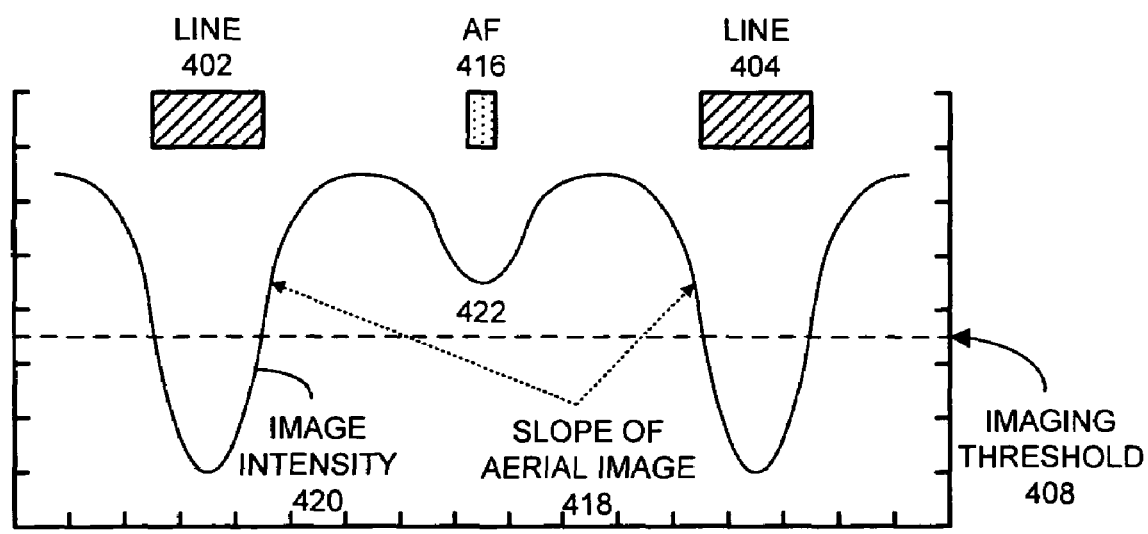
FIG. 4B illustrates how an assist feature can improve lithographic performance in accordance with an embodiment of the present invention.

FIG. 4B illustrates how an AF can improve lithographic performance in accordance with an embodiment of the present invention.

AF 416 is placed at the destructive interference node, which causes the destructive interference node 422 to move closer to the imaging threshold 408. This causes the slope of the aerial image 418 to become sharper, thereby improving lithographic performance. (Note that the drawings in FIGS. 2, 3, 4A, and 4B are for illustration purposes only and do not reflect an actual placement of AFs in a layout.)

Note that the aerial image can be calculated using an aerial image intensity model, the layout, and the AF locations. Furthermore, in one embodiment of the present invention, an aerial image gradient can be computed using an aerial image intensity model, the layout, and the AF locations.

Furthermore, note that locating interference nodes is critical for the optimal placement of AFs. Unfortunately, presently there are no known techniques for finding the location of these interference nodes in a computationally rapid and accurate manner.

One embodiment of the present invention uses an aerial image intensity model to locate optimal AF placements in a computationally rapid and accurate manner. This eliminates creating and maintaining a set of AF placement rules. In fact, the intensity model can be viewed as implementing an infinite space rule table.

In addition, in situations with complex geometries, this embodiment of the present invention can directly find optimal AF placement locations, thereby eliminating the need to create and support sophisticated and unwieldy rules table. As a result, the present invention can substantially reduce the time necessary to develop AF based correction layouts.

Gradient Magnitude of Aerial-Image

Figure 5:
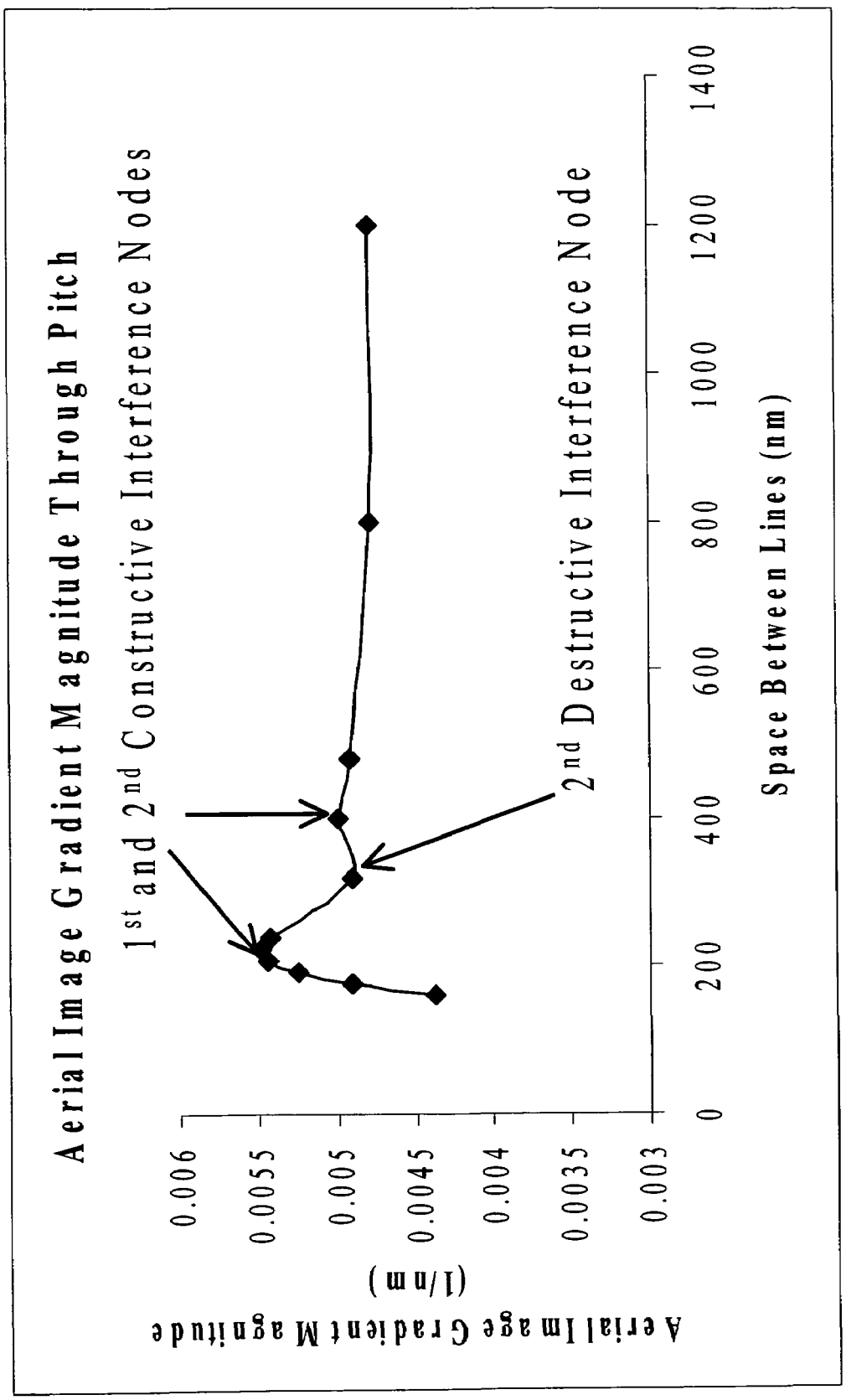
FIG. 5 illustrates a plot of the aerial image gradient magnitude against pitch for a one-dimensional feature in accordance with an embodiment of the present invention.

FIG. 5 illustrates a plot of the aerial image gradient magnitude against pitch for a one-dimensional feature in accordance with an embodiment of the present invention.

The aerial image gradient can be leveraged to rapidly locate the interference nodes. The gradient can be represented as an angle and a magnitude. When pitch is varied in a one-dimensional case, the aerial image magnitude changes while the aerial image angle remains constant. The present invention exploits this property to identify the strongest interference nodes in an aerial image relative to pitch.

Note that the local extrema in the plot shown in FIG. 5 correspond to the interference nodes in the aerial image. In one embodiment of the present invention, the locations of constructive and destructive interference nodes are identified using the magnitude of an image-intensity gradient of an aerial-image. Next, AFs are placed in the layout based on the locations of these constructive and destructive interference nodes.

Process of Placing Assist Features

Figure 6A:
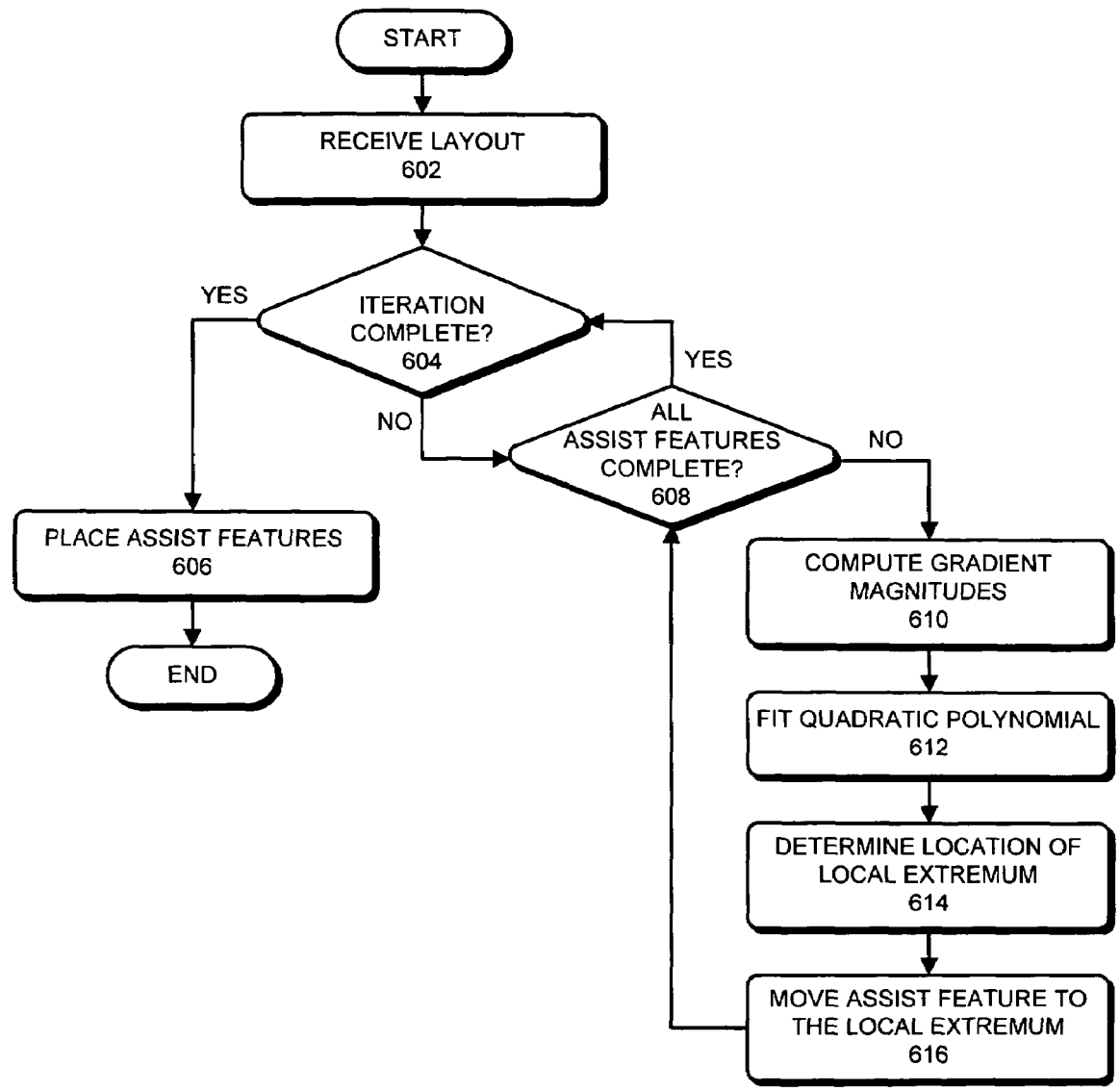
FIG. 6A presents a flowchart that illustrates the process of placing assist features in accordance with an embodiment of the present invention.

FIG. 6A presents a flowchart that illustrates the process of placing assist features in accordance with an embodiment of the present invention.

The process begins by receiving a layout of an integrated circuit (step 602).

Next, the system determines whether all iterations have been completed (step 604). (Note that the system uses an iterative process to determine where to place the assist features.)

If the system determines that the iterations are complete, the system places the assist features (step 606). (Recall that the system places assist features at the destructive interference nodes for a clear field reticle and at the constructive interference nodes for a dark field reticle.)

On the other hand, if the system determines that the iterations are not complete, the system checks whether all assist features have been completed (step 608).

If the system determines that it completed placing all assist features, it goes back to step 604 to determine whether all iterations have been completed.

Otherwise, the system places the next assist feature by first computing the gradient magnitudes (step 610).

Figure 6B:
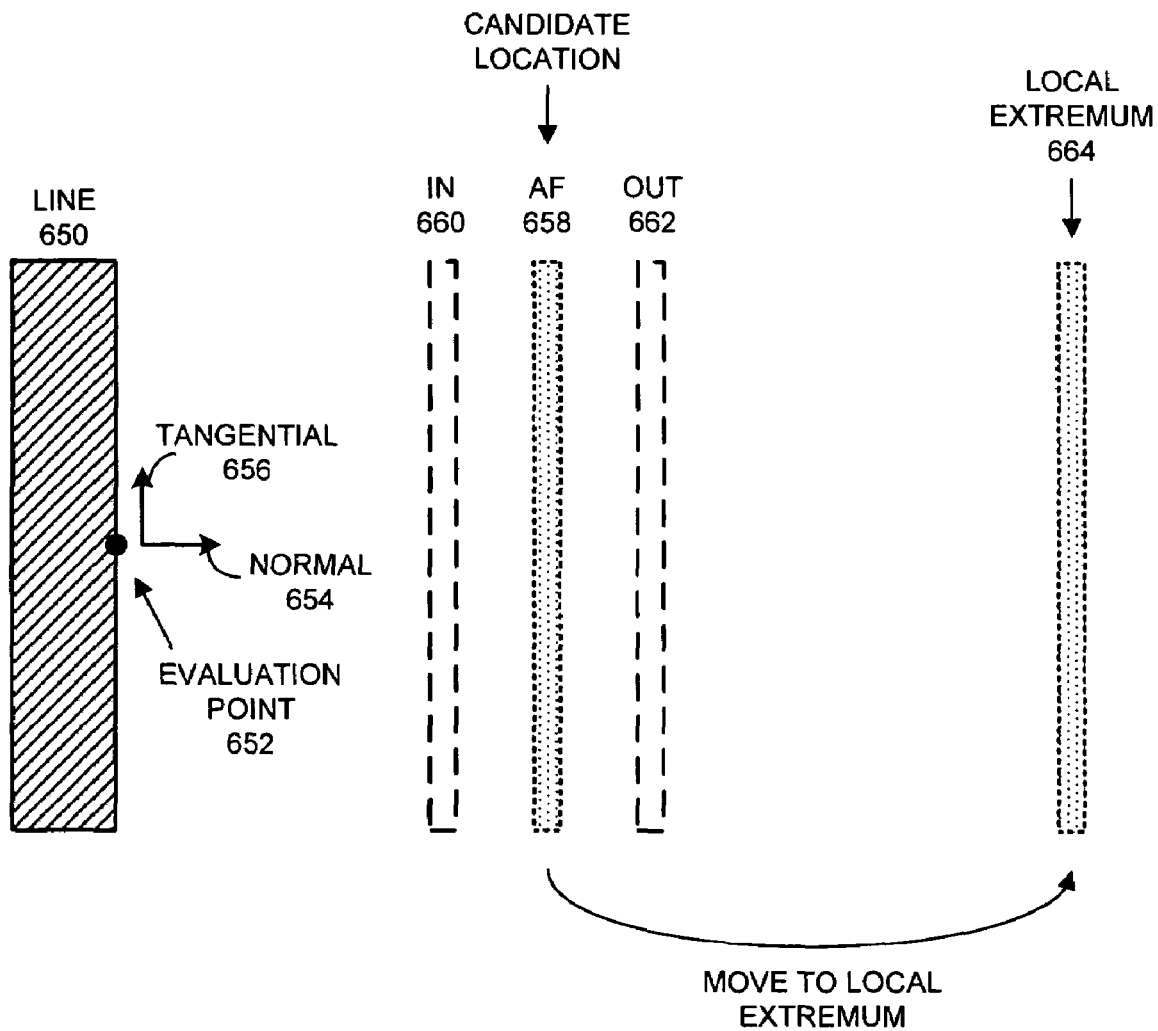
FIG. 6B illustrates the process of iteratively finding the location of the constructive and destructive interference nodes using the gradient magnitude in accordance with an embodiment of the present invention.

FIG. 6B illustrates the process of iteratively finding the location of the constructive and destructive interference nodes using the gradient magnitude in accordance with an embodiment of the present invention.

Line 650 is part of a layout of an integrated circuit. The system computes the gradient magnitude by first selecting an evaluation point 652 in the layout. The system then chooses a candidate location in the layout for placing a representative assist feature 658. (Note that the term "assist feature" can broadly refer to any feature that is used for improving lithography performance. For example, in a clear field reticle, a piece of chrome can serve as an assist feature. Conversely, in a dark field reticle, a space can serve as an assist feature.)

Next, the system determines the (final) location for placing the assist feature 658 by iteratively performing the following steps.

The system first selects a set of locations in the proximity of the candidate location. In one embodiment of the present invention, the system selects two locations, namely, "in" 660 and "out" 662.

The system then computes the aerial images using an image intensity model, the layout, and the set of locations that were chosen in the proximity of the candidate location. In one embodiment of the present invention the system computes three aerial images: the first aerial image is computed with a representative AF positioned at the candidate (or "0") location 658; the second aerial image is computed with a representative AF positioned at the "in" location 660; and the third aerial image is computed with a representative AF positioned at the "out" location 662.

Next, the system calculates a set of image gradient magnitudes at the evaluation point based on the set of aerial-images. In one embodiment of the present invention, the system evaluates the directional gradients for each of the three aerial images along the normal 654 and along the tangential 656 directions. The system then uses these directional gradients to compute three image gradient magnitudes at the evaluation point 652.

It will be apparent to one skilled in the art that a variety of techniques can be used to compute the gradient magnitude at the evaluation point. For example, in one embodiment of the present invention, the system can directly compute the gradient magnitude at the evaluation point without using the two step approach, namely, first computing the aerial image and then computing the gradient magnitude. Furthermore, in another embodiment of the present invention, the system computes the aerial image intensity for only a set of points, instead of computing the image intensity across the whole aerial image.

Furthermore, it will also be apparent to one skilled in the art that the term "gradient magnitude" can broadly refer to the rate at which the image intensity changes with respect to distance. Hence, the gradient magnitude can be calculated from the image intensity using a variety of mathematical formulas.

The system then updates the candidate location for the representative assist feature based on the set of image-gradient magnitudes. Note that the system updates the candidate location by computing a location for the representative assist feature such that the magnitude of an image-gradient at the evaluation point achieves a local extremum.

Specifically, in one embodiment of the present invention, the system first constructs an interpolating polynomial using the set of image-gradient magnitudes. Next, the system computes the location for the representative assist feature using the interpolating polynomial.

More specifically, the system computes the location of a local extremum by fitting a quadratic polynomial (step 612). Specifically, the three measured gradient values, along with their respective locations are used to compute the local minima or maxima using the following two equations:

$$GradMag = a*Loc^2 + b*Loc + c, \text{ and} \qquad \text{a.}$$

$$Loc_{af} = \frac{-b}{2a}, \qquad \text{b.}$$

where GradMag is the gradient magnitude, Loc is the location of the AF, a, b, c are unknown coefficients, and $Loc_{af}$ is the location of the local extremum. The system first uses Equation (a) to solve for the unknown coefficients a, b, and c. Next, the system uses Equation (b) to determine the location of the local extremum, $Loc_{af}$ (step 614).

It will be apparent to one skilled in the art that a number of techniques can be used to find the location of the local extremum. For example, a Newton search can be used to locate the local extremum, which may increase the speed of the search, while maintaining or improving convergence properties.

Once the local extremum for the interpolating polynomial, such as the quadratic shown in Equation (b), is found, the representative AF 658 (e.g., a representative piece of chrome) is moved to the location of the local extremum 664 (step 616). The search for the local extremum of the gradient magnitude is continued using an iterative approach. In this manner, an interference node, which is a local minimum or maximum, is found in the pattern. Additional interference nodes can be found in the same manner, by simply stepping the search further away from the pattern. Note that the step distance can be readily determined as a multiple of the first interference node, and the quadratic solving routine can be used to iterate and find the subsequent exact interference node location(s).

In the clear field case illustrated in FIG. 5, the constructive interference nodes are straightforward to locate. However, the first destructive interference node, the optimal placement location for the first AF, cannot be easily identified from the aerial image gradient. Therefore, for placing the first AF, the first constructive interference node is located, and the AF is placed at half of the first constructive interference node distance from the evaluation point.

Figure 7:
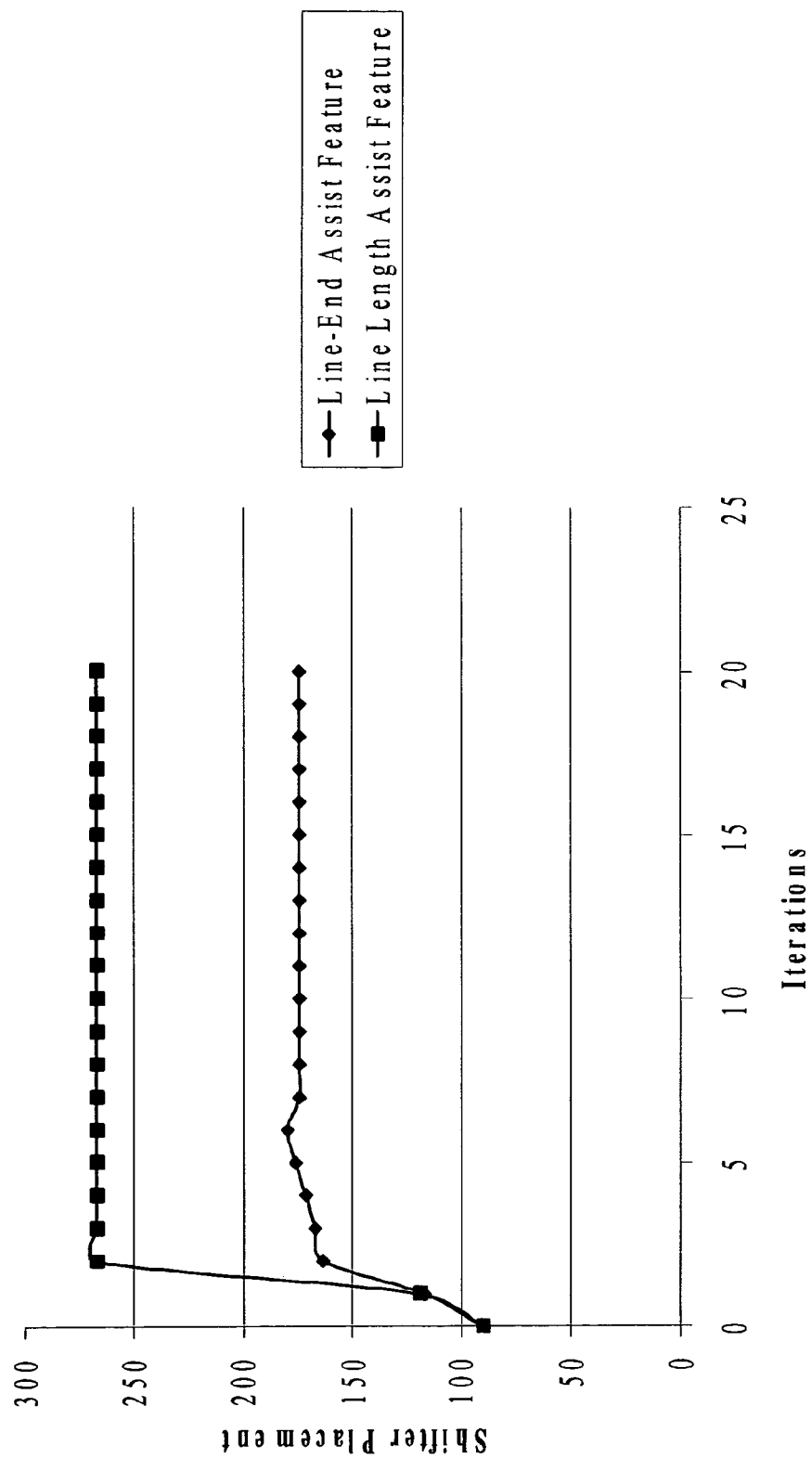
FIG. 7 presents a plot of the placement convergence over time in accordance with an embodiment of the present invention.

FIG. 7 presents a plot of the placement convergence over time in accordance with an embodiment of the present invention.

As shown in FIG. 7, the line-length (or one-dimensional) AFs, which are far away from corner features, converge to a placement solution in 4 iterations or less. On the other hand, the line-end (or two-dimensional) AFs, which are dominated by corner features, converge to a placement solution in 7 iterations, or less.

Note that the present invention can optimally place AFs, thereby maximizing depth of focus and minimizing CD uniformity. Furthermore, the present invention converges to a final solution in a limited number of iterations. Moreover, it will be apparent to one skilled in the art that the application of classical control theory can be used to improve the convergence rate. Furthermore, note that the present invention can determine the optimal AF placement more quickly than a rule-based assist placement technique.

CONCLUSION

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

For example, it will be apparent to one skilled in the art that the present invention can be integrated with optical proximity correction (OPC). Specifically, in one embodiment of the present invention, the OPC and assist feature placement can be performed in a loop until the pattern converges.

Moreover, it will also be apparent to one skilled in the art that the present invention can be extended to determine the size of the AF in addition to its location. In general, AF performance can be improved by increasing the AF size, but once the AF becomes too large, it will start imaging on the wafer. (Note that the definition of "too large" can be pattern dependent within a layout.)

Additionally, it will also be apparent to one skilled in the art that the present invention can be applied directly to a polygon or it can be applied to a segment, which can be defined as an arbitrary portion of a polygon. Furthermore, in one embodiment of the present invention, the present invention can be used to place AFs using multiple evaluation points on a polygon.

Furthermore, the data structures and code described in this detailed description are typically stored on a computer-readable storage medium, which may be any type of device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

What is claimed is:

1. A method for placing an assist feature in a layout, comprising:
   receiving a layout of an integrated circuit;
   selecting an evaluation point in the layout;
   choosing a candidate location in the layout for identifying locations of constructive and destructive interference;
   identifying the locations of constructive and destructive interference by, iteratively:
      selecting perturbation locations in proximity to the candidate location;
      determining aerial images by using an image intensity model, the layout, and by placing a representative feature at a representative location, wherein the representative location is the candidate location or one of the perturbation locations;
      determining image-gradient magnitudes at the evaluation point based on the aerial images; and
      updating the candidate location using the image-gradient magnitudes; and
   placing an assist feature in the layout based on the locations of constructive and destructive interference.

2. The method of claim 1, wherein choosing the candidate location in the layout involves identifying constructive interference location that is closest to the evaluation point.

3. The method of claim 1, wherein updating the candidate location involves computing a location for placing a representative assist feature such that a magnitude of an image-gradient at the evaluation point achieves a local extremum.

4. The method of claim 3, wherein computing the location for placing the representative assist feature such that the magnitude of the image-gradient at the evaluation point achieves the local extremum involves:
   constructing an interpolating polynomial using the image-gradient magnitudes; and
   computing the location for placing the representative assist feature using the interpolating polynomial.

5. The method of claim 1, wherein the assist feature is a sub-resolution assist feature or a super-resolution assist feature.

6. A computer-readable storage medium storing instructions that when executed by a computer cause the computer to perform a method for placing an assist feature in a layout, the method comprising:
   receiving a layout of an integrated circuit;
   selecting an evaluation point in the layout;
   choosing a candidate location in the layout for identifying locations of constructive and destructive interference;
   identifying the locations of constructive and destructive interference by, iteratively:
      selecting perturbation locations in proximity to the candidate location;
      determining aerial images by using an image intensity model, the layout, and by placing a representative feature at a representative location, wherein the representative location is the candidate location or one of the perturbation locations;

determining image-gradient magnitudes at the evaluation point based on the aerial images; and updating the candidate location using the image-gradient magnitudes; and placing an assist feature in the layout based on the locations of constructive and destructive interference.

7. The computer-readable storage medium of claim 6, wherein choosing the candidate location in the layout involves identifying a constructive interference location that is closest to the evaluation point.

8. The computer-readable storage medium of claim 6, wherein updating the candidate location involves computing a location for placing a representative assist feature such that a magnitude of an image-gradient at the evaluation point achieves a local extremum.

9. The computer-readable storage medium of claim 8, wherein computing the location for placing the representative assist feature such that the magnitude of the image-gradient at the evaluation point achieves the local extremum involves:

constructing an interpolating polynomial using the image-gradient magnitudes; and computing the location for placing the representative assist feature using the interpolating polynomial.

10. The computer-readable storage medium of claim 6, wherein the assist feature is a sub-resolution assist feature or a super-resolution assist feature.

11. An apparatus for placing an assist feature in a layout, comprising:

a receiving mechanism configured to receive a layout of an integrated circuit;

a selecting mechanism configured to select an evaluation point in the layout;

a choosing mechanism configured to choose a candidate location in the layout for identifying locations of constructive and destructive interference;

an identifying mechanism configured to identify the locations of constructive and destructive interference by, iteratively:

selecting perturbation locations in proximity to the candidate location;

determining aerial images by using an image intensity model, the layout, and by placing a representative feature at a representative location, wherein the representative location is the candidate location or one of the perturbation locations;

determining image-gradient magnitudes at the evaluation point based on the aerial images; and updating the candidate location using the image-gradient magnitudes; and a placing mechanism configured to place an assist feature in the layout based on the locations of constructive and destructive interference.

12. The apparatus of claim 11, wherein the identifying mechanism is configured to identify a constructive interference location that is closest to the evaluation point.

13. The apparatus of claim 11, wherein the identifying mechanism is configured to compute a location for placing a representative assist feature such that a magnitude of an image-gradient at the evaluation point achieves a local extremum.

14. The apparatus of claim 13, wherein the identifying mechanism is configured to compute the location for placing the representative assist feature such that the magnitude of the image-gradient at the evaluation point achieves the local extremum by, constructing an interpolating polynomial using the image-gradient magnitudes; and computing the location for placing the representative assist feature using the interpolating polynomial.

15. The apparatus of claim 11, wherein the assist feature is a sub-resolution assist feature or a super-resolution assist feature.

* * * * *